US008836841B2

(12) United States Patent
Nakajima et al.

(10) Patent No.: US 8,836,841 B2
(45) Date of Patent: Sep. 16, 2014

(54) ELECTRONIC APPARATUS

(75) Inventors: Shinichi Nakajima, Tokyo (JP);
Masakazu Sekiguchi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/611,970

(22) Filed: Sep. 12, 2012

(65) Prior Publication Data

US 2013/0002924 A1     Jan. 3, 2013

Related U.S. Application Data

(63) Continuation of application No. PCT/JP2010/006827, filed on Nov. 22, 2010.

(30) Foreign Application Priority Data

Mar. 15, 2010    (JP) ................................. 2010-058351

(51) Int. Cl.
*H04N 5/222*      (2006.01)
*G06F 9/44*      (2006.01)
*G06F 3/01*      (2006.01)
*G03B 17/18*      (2006.01)
*H04N 5/235*      (2006.01)
*H04N 5/232*      (2006.01)
*H04N 5/351*      (2011.01)
*G03B 17/02*      (2006.01)
*H04N 5/225*      (2006.01)

(52) U.S. Cl.
CPC .......... *H04N 5/23293* (2013.01); *G06F 9/4446* (2013.01); *G06F 3/011* (2013.01); *G03B 17/18* (2013.01); *H04N 5/2351* (2013.01); *H04N 5/23248* (2013.01); *H04N 5/23212* (2013.01); *H04N 5/23254* (2013.01); *H04N 5/351* (2013.01); *G03B 17/02* (2013.01); *G06F 2203/011* (2013.01); *H04N 5/232* (2013.01); *H04N 5/23219* (2013.01); *H04N 5/2251* (2013.01); *H04N 5/23287* (2013.01)
USPC ..................................................... 348/333.02

(58) Field of Classification Search
USPC ..................................................... 348/333.02
See application file for complete search history.

(56) References Cited

U.S. PATENT DOCUMENTS

2004/0010803 A1*   1/2004   Berstis ......................... 725/105
2008/0292148 A1   11/2008   Maruyama et al.
(Continued)

FOREIGN PATENT DOCUMENTS

JP     A-2005-270543     10/2005
JP     A-2008-23127      2/2008
(Continued)

OTHER PUBLICATIONS

Jan. 25, 2011 International Search Report issued in International Application No. PCT/JP2010/006827 (with translation).

(Continued)

*Primary Examiner* — James Hannett
(74) *Attorney, Agent, or Firm* — Oliff PLC

(57) ABSTRACT

When complicated functions are provided to an electronic apparatus, the number of menu items to be set and guide items to be reference by a user increases. A user can become lost when searching through the menu items to be set and guide items to be referenced from among items in a hierarchical configuration grouped in categories and displayed in the display section. The electronic apparatus according to an aspect of the present invention comprises a processing section that performs processing; a display section that performs display; and a control section that, when a change in biometric information of a user is obtained, causes the display section to display a display screen that includes at least one of a setting screen and a guide screen relating to the processing of the processing section.

20 Claims, 11 Drawing Sheets

(56) References Cited

U.S. PATENT DOCUMENTS

| 2010/0125816 | A1* | 5/2010 | Bezos | 715/863 |
| 2011/0191840 | A1* | 8/2011 | Ortiz et al. | 726/7 |

FOREIGN PATENT DOCUMENTS

| JP | A-2008-77259 | 4/2008 |
| JP | A-2009-081784 | 4/2009 |
| JP | A-2009-158989 | 7/2009 |
| JP | A-2009-210992 | 9/2009 |
| JP | A-2010-15360 | 1/2010 |
| JP | A-2010-50927 | 3/2010 |

OTHER PUBLICATIONS

Oct. 23, 2012 International Preliminary Report on Patentability issued in International Application No. PCT/JP2010/006827/.

Feb. 4, 2014 Office Action issued in Japanese Patent Application No. 2010-058351 (with translation).

May 5, 2014 Office Action issued in Chinese Patent Application No. 2010800628383 (with translation).

* cited by examiner

ELECTRONIC APPARATUS

This is a Continuation of International Application No. PCT/JP2010/006827 filed Nov. 22, 2010, which claims the benefit of priority of Japanese Patent Application No. 2010-058351 filed Mar. 15, 2010. The disclosure of the prior applications is hereby incorporated by reference herein in its entirety.

TECHNICAL FIELD

The present invention relates to an electronic apparatus.

BACKGROUND ART

An image capturing device is known that estimates the emotional state of a photographer by detecting biometric information of the photographer, and assists with the image capturing operation based on the estimated emotional state. For example, in response to a high emotional level, the camera shake correction gain is adjusted to improve the tracking characteristics of the correction lens.
Patent Document 1: Japanese Patent Application Publication No. 2009-210992

DISCLOSURE OF THE INVENTION

Problems to be Solved by the Invention

When complicated functions are provided to an electronic apparatus, the number of menu items set by a user increases. These menu items are arranged in a branching hierarchy in which the items are grouped in a plurality of categories according to type and each category includes related items. A user can become lost when searching through the menu items grouped in categories and displayed in the display section to find a desired menu item.

Furthermore, in recent electronic apparatuses, there is often a user guide that provides information on how to use the various functions, and the user guide is also usually configured in a hierarchical manner. Therefore, the user can have problems finding the desired information in the user guide, in the same manner as when searching for menu items.

Means for Solving the Problems

The electronic apparatus according to an aspect of the present invention comprises a processing section that performs processing; a display section that performs display; and a control section that, when a change in biometric information of a user is obtained, causes the display section to display a display screen that includes at least one of a setting screen and a guide screen relating to the processing of the processing section.

The summary clause does not necessarily describe all necessary features of the embodiments of the present invention. The present invention may also be a sub-combination of the features described above.

BEST MODE FOR CARRYING OUT THE INVENTION

Hereinafter, some embodiments of the present invention will be described. The embodiments do not limit the invention according to the claims, and all the combinations of the features described in the embodiments are not necessarily essential to means provided by aspects of the invention.

Figure 1:
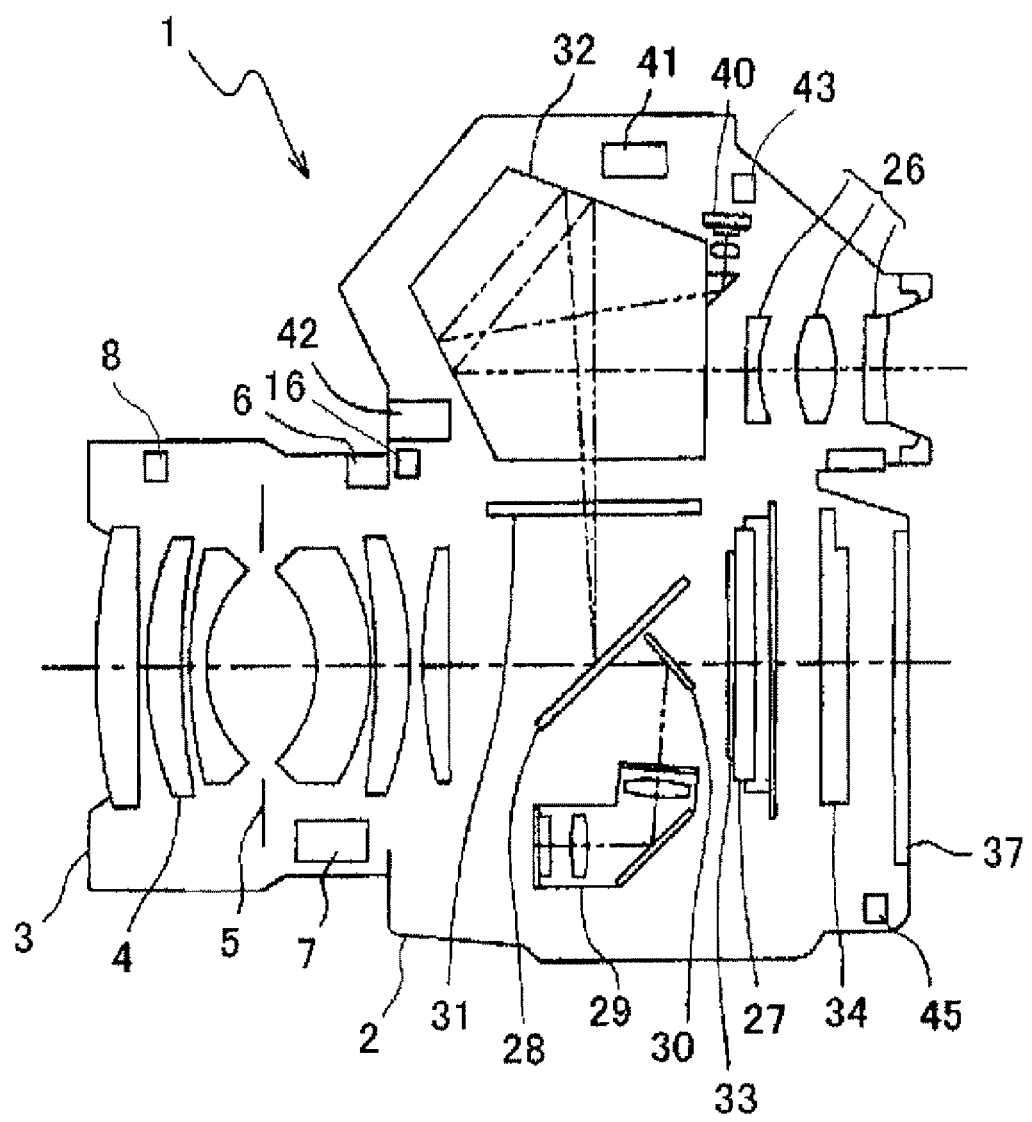
FIG. 1 is a cross-sectional view of components in a camera system.

FIG. 1 is a cross-sectional view of a camera system 1 according to an embodiment of the present invention. In the present embodiment, the camera system 1 is described as an example of an electronic apparatus and a mobile device. The camera system 1 is a single-lens reflex camera with an exchangeable lens, and functions as an image capturing apparatus resulting from the combination of a camera body 2 and an exchangeable photography lens 3.

The photography lens 3 includes a lens group 4 that has a focus lens, a zoom lens, and an image-stabilizing lens, a diaphragm 5, an angular velocity sensor 6 for detecting camera shake of the camera system 1, and a drive apparatus, not shown, that drives the lens group 4. The angular velocity sensor 6 detects vibration on at least two axes orthogonal to the optical axis. The drive apparatus may include a plurality of motors, such as oscillating wave motors and VCMs, drives the focus lens in a direction of the optical axis, and drives the image-stabilizing lens in a different direction than the optical axis direction.

The photography lens 3 includes a lens CPU 7 that operates together with the camera body 2 to control the overall photography lens 3. The photography lens 3 includes a lens-side biosensor section 8 that detects the pressure with which the photography lens 3 is held, body temperature, amount of sweat, blood pressure, blood flow, and heart rate of the photographer, for example.

The camera body 2 includes a main mirror 28 that pivots between a reflecting position, which is a position for reflecting light from the photography lens 3 to a finder optical system 26, and a withdrawn position in which the main mirror 28 is withdrawn such that the light from the photography lens 3 is incident to an image capturing element 27, which is formed by CCD or CMOS elements. A portion of the main mirror 28 is a semi-transparent region, and the camera body 2 includes a sub-mirror 30 that reflects the light passed through this semi-transparent region to a focal point detection sensor 29. The sub-mirror 30 pivots together with the main mirror 28, and the sub-mirror 30 is also withdrawn from the path of the light when the main mirror 28 is at the withdrawn position. The focal point detection sensor 29 detects the focal point state of the incident light based on the phase difference.

The light reflected by the main mirror 28 at the reflecting position is guided to the finder optical system 26 through a focusing screen 31 and a pentaprism 32. The finder optical system 26 is formed by a plurality of lenses, and the photographer can use the finder optical system 26 to check the field being captured.

A portion of the light passed by the pentaprism 32 is guided to a photometric sensor 40. The photometric sensor 40 measures light incident to each of a plurality of regions of the photography lens 3 to generate a brightness distribution of the field being captured. A GPS (Global Positioning System) module 41 is disposed above the pentaprism 32, and the camera system 1 receives a signal from a GPS satellite to acquire position information. The camera body 2 includes a microphone 42 that acquires sound in the field being captured and is positioned in a manner to not interfere with the photography lens 3 when the photography lens 3 is mounted on a mount section, and also includes a speaker 43 near the finder optical system 26. The focal point detection sensor 29, the photometric sensor 40, the GPS module 41, and the microphone 42 are examples of environment sensors, in the sense that these components acquire information concerning the environment in which the camera system 1 is used.

When the main mirror 28 is at the withdrawn position, the light from the photography lens 3 is incident to the image capturing element 27 through the low-pass filter 33. An image capturing substrate 34 is disposed near the image capturing element 27, and a rear surface monitor 37 is provided behind the image capturing substrate 34 to face outward.

The camera body 2 includes a camera-side biosensor section 16 that detects the pressure with which the camera body 2 is held, body temperature, amount of sweat, blood pressure, blood flow, or heart rate of the photographer, for example, at a position where a finger of the right hand of the photographer touches the camera-side biosensor section 16. The specific configuration and arrangement of the camera-side biosensor section 16 is described further below.

Furthermore, the camera body 2 includes an attitude sensor 45. The attitude sensor 45 detects the attitude of the camera system 1. Specifically, the detects whether the camera system 1 is oriented vertically or laterally, and further detects whether the camera system 1 is tilted forward such that the photographer can more easily view the rear surface monitor 37.

Figure 2:
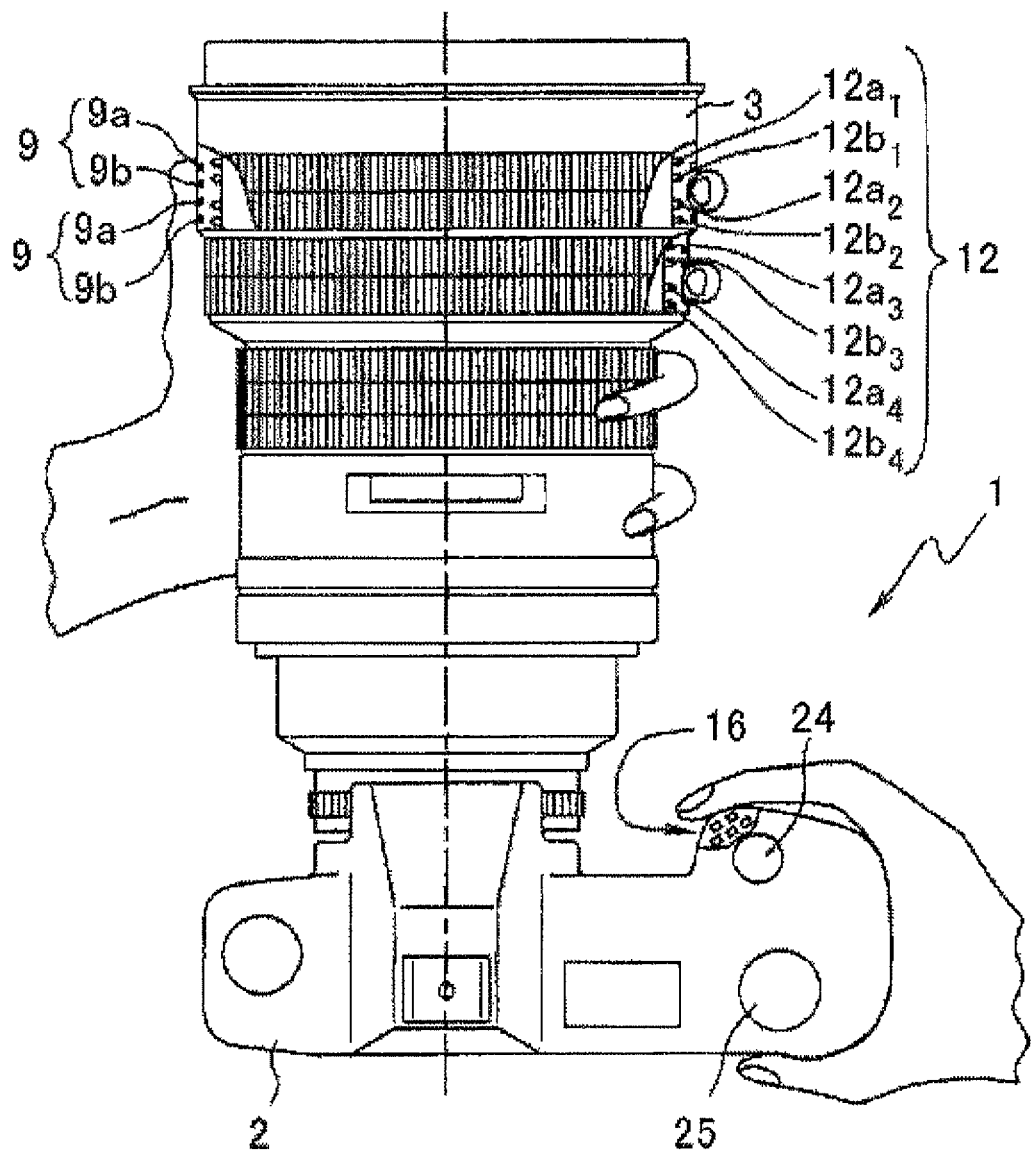
FIG. 2 is an overhead perspective view of the camera system.

FIG. 2 is a perspective view of the top of the camera system 1 according to the present embodiment. Specifically, FIG. 2 shows a state in which the operator holds the photography lens 3 with the left hand while holding the pulse camera body 2 with the right hand. As described above, the photography lens 3 includes lens-side biosensor sections 8 that detect the pressure with which the photography lens 3 is held, body temperature, amount of sweat, blood pressure, blood flow, or heart rate of the photographer, for example. The lens-side biosensor sections 8 are positioned to be touched by the fingers or the palm of the left hand of the photographer.

In FIG. 2, a heart rate detection apparatus 9 and a pulse detection apparatus 12 are shown as a portion of the lens-side biosensor sections 8. The heart rate detection apparatus 9 includes a plurality of electrode sections each formed by a reference electrode 9a and a detection electrode 9b provided at a distance from each other, and the heart rate detection apparatus 9 detects the heart rate of the photographer. The pulse detection apparatus 12 is formed by a plurality of light emitting sections $12a$ ($12a_1$ to $12a_4$) and corresponding light receiving sections $12b$ ($12b_1$ to $12b_4$) arranged in an alternating manner, and the pulse detection apparatus 12 detects the pulse of the photographer. As described further below, the pulse detection apparatus 12 is used to measure the blood flow and blood pressure of the photographer.

As described above, the camera body 2 includes the camera-side biosensor section 16 at a location to be touched by a finger on the right hand of the photographer. When the photographer holds the camera body 2, the thumb on the right hand is positioned on the rear surface of the camera body 2 and the pointer finger is positioned near a release SW 24, and therefore these fingers are distanced from the other three fingers positioned on the grip section. As a result, the camera-side biosensor sections 16 are distanced from each other and provided at a rear camera position corresponding to the thumb of the right hand, a release SW 24 proximate position corresponding to the pointer finger, and a front camera position near the grip portion that corresponds to the other three fingers. The camera-side biosensor section 16 corresponding to the pointer finger may be provided on the surface of the release SW 24.

In the camera body 2, at least one of the front camera position where the camera body 2 is held by the thumb and three fingers excluding the pointer finger on the right hand and the rear camera position where corresponding to the thumb of the right hand serves as a holding portion for holding the camera body 2. Furthermore, a plurality of operating SWs are provided on the rear surface of the camera body 2, and these operating SWs are operated by the right thumb. An image capturing mode SW 25 for setting the image capturing mode is provided on the top surface of the camera body 2.

Figure 3:
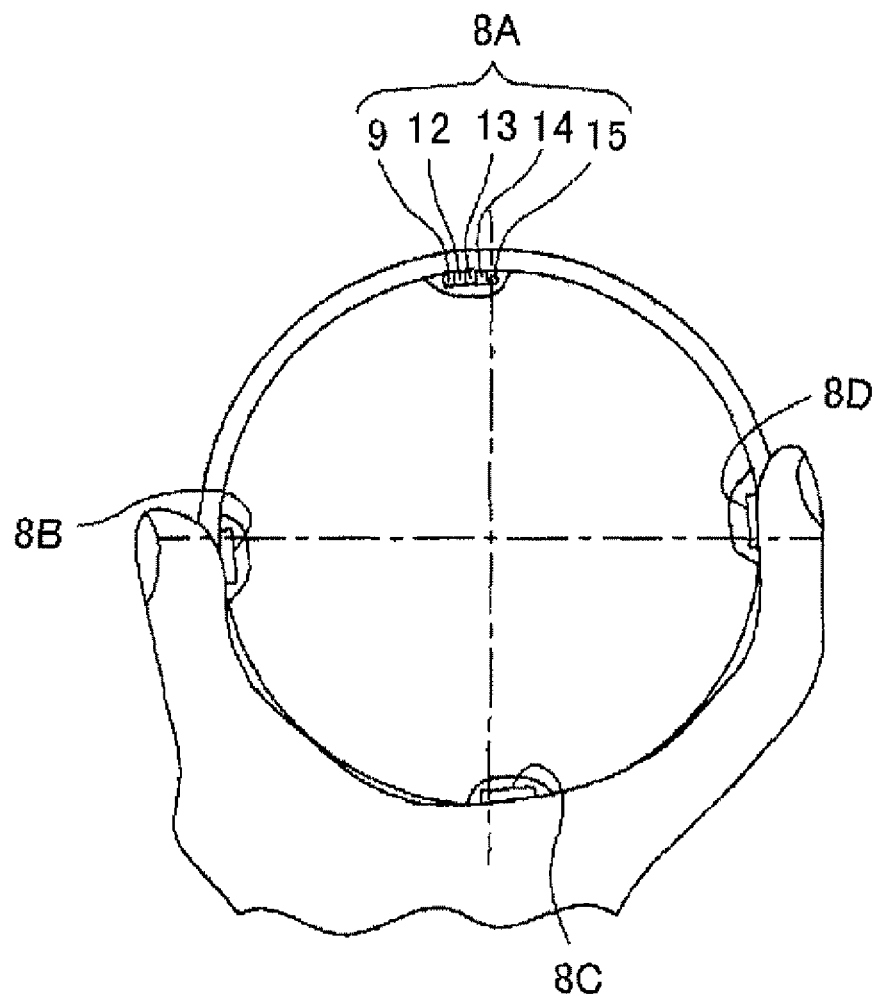
FIG. 3 shows a first state in which the photography lens is held with the left hand.
Figure 4:
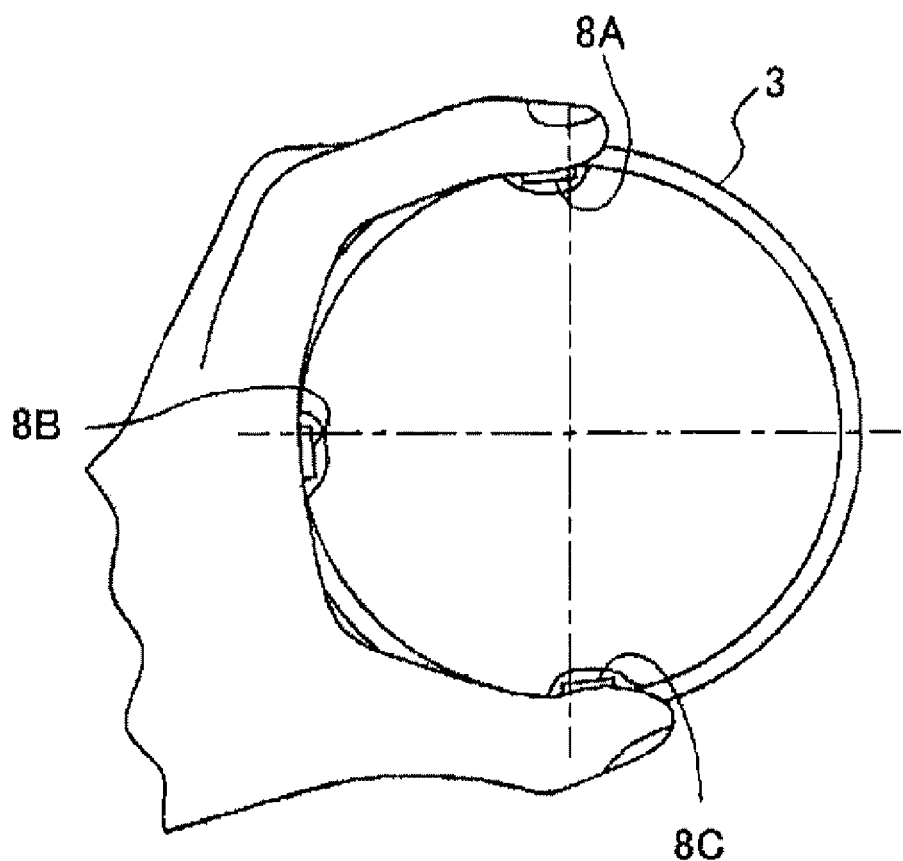
FIG. 4 shows a second state in which the photography lens is held with the left hand.

FIG. 3 shows a first state in which the photography lens 3 is held by the left hand. In the first state, the back of the left hand is positioned at the bottom when holding the photography lens 3. FIG. 4 shows a second state in which the photography lens 3 is held by the left hand. In the second state, the back of the hand is positioned on the left side when holding the photography lens 3.

When the photographer holds the photography lens 3 and performs a zoom operation or manual focus operation, the thumb of the left hand is distanced from the other fingers. Furthermore, the method for holding the photography lens changes depending on the photographer or the photography conditions, such as horizontally oriented photography or vertically oriented photography. Therefore, the plurality of lens-side biosensor sections 8 (8A to 8D) are provided in the circular periphery of the photography lens 3.

Specifically, the lens-side biosensor sections 8 are disposed at least at one of a zoom operation position and a manual focus operation position, and are disposed apart from each other at a position corresponding to the thumb of the left hand and a position corresponding to a finger other than the thumb. More specifically, the lens-side biosensor sections 8 are disposed at positions where zoom operation rubber or focus operation rubber is disposed, and are disposed in a manner to contact the left hand or face the left hand.

The lens-side biosensor section 8A further includes a sweat sensor 13 that detects the amount of sweat of the photographer, a temperature sensor 14 that detects the body temperature of the photographer, and a pressure sensor 15 that detects the pressure with which the photographer holds the photography lens 3, in addition to the heart rate detection apparatus 9 and the pulse detection apparatus 12 described above.

The lens-side biosensor sections 8B to 8D each include a heart rate detection apparatus 9, a pulse detection apparatus 12, a sweat sensor 13, a temperature sensor 14, and a pressure sensor 15, in the same manner as the lens-side biosensor section 8A. In this way, biometric information can be detected from the palm of the left hand by providing the lens-side biosensor sections 8A to 8D on the circular periphery of the photography lens 3.

In the present embodiment, the plurality of lens-side biosensor sections 8A to 8D are provided according to the zoom operation position and the manual forces operation position, for example, but other lens-side biosensor sections 8 may be provided at positions other than those described above, as long as the positions allow for detection of the biometric information when the method of holding the photography lens 3 changes due to a different photographer or different photography state, for example. Furthermore, since the thumb of the left hand does not exert a large force for holding the photography lens 3, the lens-side biosensor sections 8B and 8C may have the pressure sensor 15 corresponding to the thumb of the left hand omitted therefrom. Similarly, if a high degree of detection precision is not needed for the lens-side biosensor sections 8, the number of components in the photography lens 3 can be reduced by omitting sensors from the position corresponding to the left thumb. Furthermore, the lens CPU 7 may control the light to be emitted from the light emitting section 12a of the pulse detection apparatus 12 only when a finger is in contact with the pulse detection apparatus 12.

Figure 5:
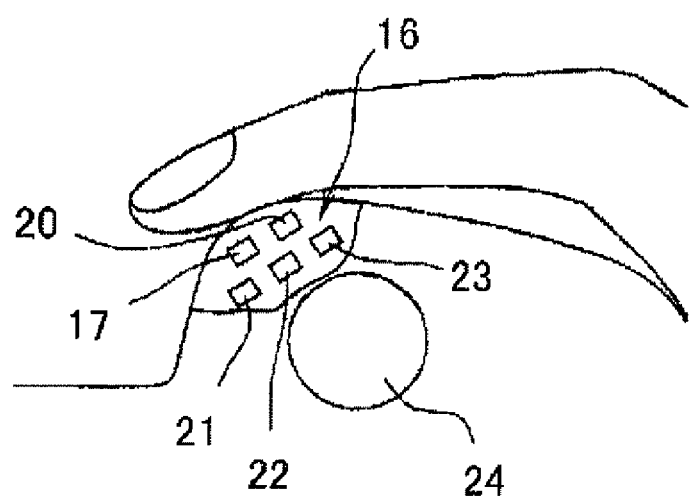
FIG. 5 shows a camera-side biosensor section provided on the camera body.

FIG. 5 shows the camera-side biosensor section 16 provided near the release SW 24 of the camera body 2. As shown in FIG. 5, the camera-side biosensor section 16 includes a heart rate detection apparatus 17, which has the same configuration as the heart rate detection apparatus 9, and a pulse detection apparatus 20, which has the same configuration as the pulse detection apparatus 12. The camera-side biosensor section 16 also includes a sweat sensor 21 that detects the amount of sweat of the photographer, a temperature sensor 22 that detects the body temperature of the photographer, and a pressure sensor 23 that detects the pressure with which the photographer holds the camera body 2. As described above, in addition to the position corresponding to the pointer finger of the right hand shown in FIG. 5, camera-side biosensor sections 16 are also provided at the rear camera position corresponding to the thumb and front camera position corresponding to the other three fingers, and each camera-side biosensor section 16 has the same configuration.

Figure 6:
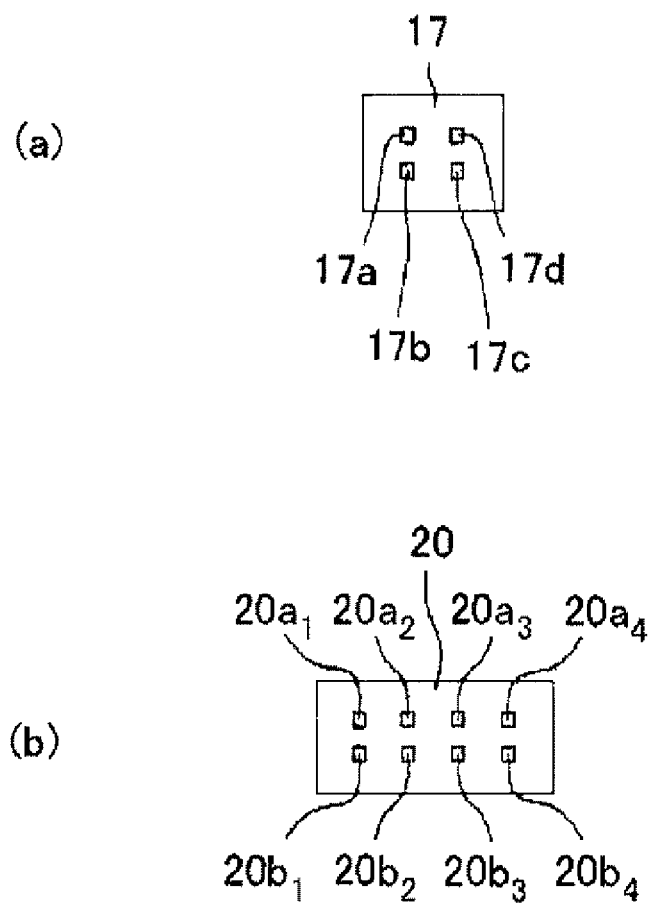
FIG. 6 shows configurations of a heart rate detection apparatus and a pulse detection apparatus.

FIG. 6 shows the configurations of the heart rate detection apparatus 17 and the pulse detection apparatus 20 of the camera-side biosensor section 16. As shown in FIG. 6A, the heart rate detection apparatus 17 includes a plurality of electrode sections that each include a reference electrode 17a and a detection electrode 17b distanced from each other, and the heart rate detection apparatus 17 detects the heart rate of the photographer. As shown in FIG. 6B, the pulse detection apparatus 20 is formed by a plurality of light emitting sections $20a_1$ to $20a_4$ and corresponding light receiving sections $20b_1$ to $20b_4$ arranged in an alternating manner, and the pulse detection apparatus 20 detects the pulse of the photographer.

Figure 7:
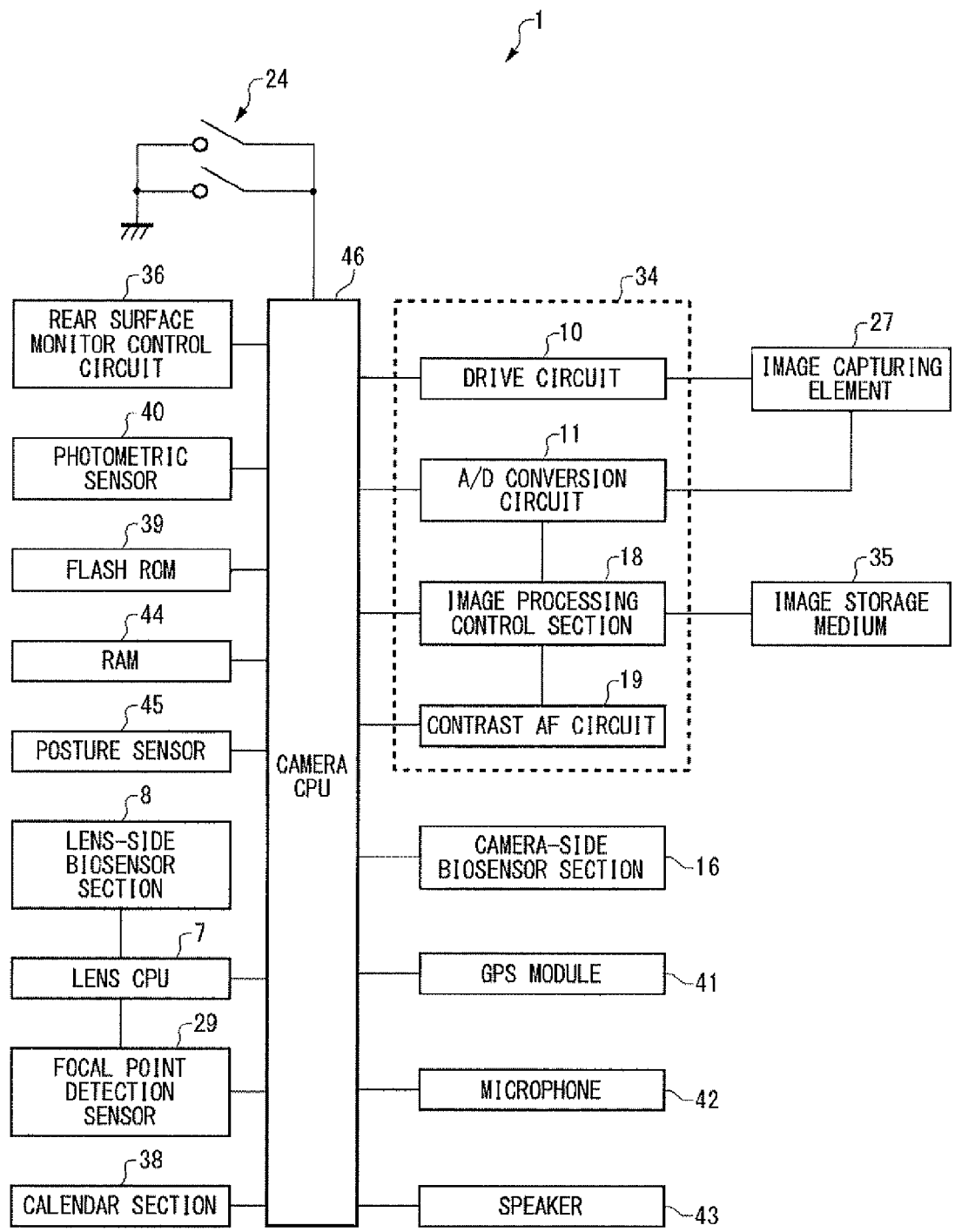
FIG. 7 is a block diagram of the camera system.

FIG. 7 is a block diagram of the camera system 1 according to the present embodiment. The image capturing substrate 34 includes a drive circuit 10 that drives the image capturing element 27, an A/D conversion circuit 11 that converts the output of the image capturing element 27 into a digital signal, an image processing control circuit 18 formed by ASIC, and a contrast AF circuit 19 that extracts a high frequency component of the signal from the image capturing element 27.

The image processing control circuit 18 applies image processing such as white balance adjustment, sharpness adjustment, gamma correction, and grayscale adjustment to the image signal that has been converted into a digital signal, and performs image compression such as PEG on the image signal to generate an image file. The generated image file is stored in the image recording medium 35. The image recording medium 35 may be a storage medium such as a flash memory that can be attached to the camera body 2, or may be a storage medium such as an SSD (solid state drive) that is housed in the camera body 2.

The image signal that has undergone this image processing is displayed in the rear surface monitor 37 under the control of the rear surface monitor control circuit 36. If the image signal resulting from the image capturing is displayed for a prescribed time after the image capturing, a record-review display can be realized in which the photographer can view an image corresponding to the image file stored in the image recording medium 35. Furthermore, a live view display can be realized if a target image that is continuously photoelectrically converted by the image capturing element 27 is continuously displayed in the rear surface monitor 37 without being stored in the image recording medium 35. Moving image capturing can be realized if the image processing control circuit 18 performs a moving image compression process such as MPEG or H.264 on the target image that is continuously photoelectrically converted by the image capturing element 27, and the resulting moving image is stored in the image recording medium 35. At this time, the sound in the field being captured is gathered by the microphone 42 and stored in synchronization with the moving image data. The frame rate of the generated moving image is set by selecting from among a plurality of frame rates, and may be 30 fps, for example.

The contrast AF circuit 19 extracts a high frequency component of the image capture signal from the image capturing element 27 to generate an AF evaluation image, and detects the focus lens position that maximizes the high frequency component. Specifically, a band-pass filter is used to extract a prescribed high frequency from the image signal received from the image processing control circuit 18, and a wave detection process such as peak-hold or integration is applied to generate the AF evaluation value signal. The generated AF evaluation value signal is output to the camera CPU 46.

The lens CPU 7 realizes the optical camera-shake correction by driving the image-stabilizing lens in the photography lens 3 in a direction differing from the optical axis direction, such that the camera-shake detected by the angular velocity sensor 6 is cancelled out. The camera-shake correction is not limited to this type of optical camera-shake correction, and the image capturing element 27 can be provided with a drive mechanism to perform an image capturing element drive camera-shake correction that cancels out the camera-shake by driving the image capturing element 27 in a direction differing from the optical axis direction. Furthermore, an electronic camera-shake correction can be used, whereby motion vectors between a plurality of images output by the image processing control circuit 18 are calculated and the camera shake is cancelled out by reading the images and controlling the position in a manner to cancel out the calculated motion vectors between the images. The optical camera-shake correction and the image capturing element drive camera-shake correction are particularly preferable when capturing still images, and can also be applied when capturing moving images. The electronic camera-shake correction is preferable when capturing moving images. These methods may be selected as needed or combined.

As described above, the photometric sensor 40 measures the brightness distribution of the capture field by measuring the light incident to each of a plurality of regions of the photography lens 3, and the measurement results are output to the camera CPU 46. In the camera CPU 46, an exposure value is calculated according to the selected photometric mode. The photometric mode can be selected from among a divisional photometric mode for obtaining a balance between light portions and dark portions, a center point photometric mode for exposing the center of the screen by an appropriate amount, and a spot photometric mode for exposing a selected focal point in a narrow range by an appropriate amount, for example.

The calendar section 38 includes a liquid crystal oscillator and an integrated circuit for keeping time, for example, and holds calendar information indicating year, month, day, and time. The camera CPU 46 can suitably detect information relating to the time from the calendar section 38. The GPS module 41 receives a signal from a GPS satellite and acquires information indicating the latitude, longitude, and altitude of the camera body 2. The camera CPU 46 can suitably detect information relating to the present position of the camera body 2 from the GPS module 41.

The flash ROM 39 is an EEPROM®, and is a storage medium that stores programs causing the camera system 1 to operate, as well as various setting values and adjustment values. Specifically, the focal point detection sensor 29 stores AF adjustment data, AE adjustment data, data concerning the date and time of manufacture, setting history for the setting SW, and the like. In particular, various setting values set by the photographer are managed in a branching hierarchical menu configuration in which the menu items of the camera system 1 are divided into several categories according to type and each category includes associated topics. A user guide for guiding the photographer with respect to functions of the camera system 1 is also managed in a branching hierarchical menu system in which the user guide is divided into a plurality of categories according to type and each category includes a plurality of associated topics, in the same manner as the menu items. The flash ROM 39 stores usage history for a prescribed number of displays of the menu setting screen and the user guide screen.

Furthermore, biometric information values of the photographer in a normal state are stored in the flash ROM 39. In the present embodiment, the flash ROM 39 stores pressure with which the photography lens 3 is held, pressure with which the camera body 2 is held, body temperature, amount of sweat, blood pressure, blood flow, and heart rate of the photographer as the biometric information.

The RAM 44 is a high-speed RAM such as a DRAM, that can expand the program stored in the flash ROM 39 to access the camera CPU 46 at high speed. The various setting values and adjustment values that are frequently referenced are copied from the flash ROM 39 to facilitate access from the camera CPU 46.

In addition to displaying images processed in the manner described above, the rear surface monitor control circuit 36 also displays a menu setting screen and a user guide screen read from the flash ROM 39 in the rear surface monitor 37. A touch panel sensor is layered on the screen of the rear surface monitor 37, and when the photographer operates the touch panel sensor while viewing the menu items of the rear surface monitor 37, the coordinates and the corresponding menu item displayed at these coordinates are output to the camera CPU 46.

As described above, the attitude sensor 45 detects the attitude of the camera system 1. The attitude sensor 45 is a simple device formed by a combination of sensors that detect attitude in an axial direction by having a small sphere that is moved by gravity to block infrared light of a photo-interrupter. When a precise angle is to be detected as the attitude of the camera system 1, a three-axis acceleration sensor is used, for example. In particular, in the present embodiment, the attitude sensor 45 detects whether the camera system 1 is tilted forward, which is an attitude with which the photographer can easily view the rear surface monitor 37.

The release SW 24 is a two-stage switch. When the photographer presses the release SW 24 half way, the camera CPU 46 uses the lens-side biosensor sections 8 and the camera-side biosensor sections 16 to begin detection of the biometric information of the photographer and to perform image capture preparation operations such as autofocus and light measurement. When the photographer fully presses the release SW 24, the camera CPU 46 starts the operation to capture a still image or a moving image.

The camera CPU 46 works together with the lens CPU 7 to control the overall camera system 1. In the present embodiment, the biometric information of the photographer is acquired based on the output of the lens-side biosensor sections 8 and the camera-side biosensor sections 16, and operations for assisting the camera system 1 are controlled. The following describes the acquisition of the biometric information of the photographer by the lens-side biosensor sections 8 and the camera-side biosensor sections 16.

First, the heart rate measurement will be described. As described above, the reference electrodes 9a and detection electrodes 9b of the heart rate detection apparatus 9 are disposed at positions where the photography lens 3 is held by the left hand of the photographer, and the reference electrodes 17a and detection electrodes 17b of the heart rate detection apparatus 17 are disposed at positions where the camera body 2 is held by the right hand of the photographer. The difference between the potentials detected by the detection electrodes 9b and 16b is amplified by a differential amplifier, not shown, and output to the camera CPU 46. The body camera CPU 46 calculates the heart rate of the photographer based on the potential difference between the detection electrodes 9b and 16b.

If the photographer is not holding the photography lens 3, the left hand of the photographer is not in contact with the reference electrode 9a or the detection electrode 9b, and therefore the connection between the reference electrode 9a and the detection electrode 9b is open. When the connection between the reference electrode 9a and the detection electrode 9b is open, the lens CPU 7 determines that the photographer is not holding the photography lens 3. Similarly, when the connection between the reference electrode 17a and the detection electrode 17b of the heart rate detection apparatus is open, the camera CPU 46 determines that the photographer is not holding the camera body 2.

The following describes the blood pressure measurement. The pulse detection apparatuses 12 and 20 measure the blood pressure of the photographer. The pulse detection apparatus 12 and the pulse detection apparatus 20 have the same configuration, and therefore the following detailed description of the pulse measurement includes only the pulse detection apparatus 12. The pulse detection apparatus 12 emits infrared rays, for example, from the light emitting section 12a, the infrared rats are reflected by the arteries in the fingers, and the reflected infrared rays are received by the light receiving section 12bm which is an infrared sensor, thereby detecting the pulse in the fingers. In other words, the pulse detection apparatus 12 detects the blood flow in a peripheral blood vessel. The camera CPU 46 calculates the blood pressure of the photographer based on the pulse received from the pulse detection apparatus 12. When it is determined that a finger of the photographer, e.g. the pinky, is not touching the photography lens 3 based on the outputs of the reference electrodes 9a and the detection electrodes 9b of the heart rate detection apparatuses 9, the lens CPU 7 prevents meaningless light output and the emission of stray light into the capture field by prohibiting the emission of light from the light emitting section 12a arranged to correspond to the pinky finger. Similarly, when it is determined that the thumb of the photographer is not touching the camera body 2 based on the outputs of the reference electrodes 17a and the detection electrodes 17b of the heart rate detection apparatus 17, the camera CPU 46 may prohibit light emission from the light emitting section 20a of the pulse detection apparatus 20.

The following describes the sweat measurement. Sweat can be detected by measuring the impedance of the hand. The sweat sensors 13 and 21 have a plurality of electrodes and detect sweat. A portion of these electrodes may also be used as the reference electrodes 9a and the reference electrodes 17a. A sweat sensor 13 is disposed in each of the lens-side biosensor sections 8A to 8D, but since sweat caused by emotional states such as happiness, excitement, or nervousness occurs in small amounts and in a short time, the lens-side biosensor sections 8B and 8C may be disposed at positions corresponding to the center of the palm, which creates more sweat than the fingers.

The following describes the temperature measurement. The temperature sensors 14 and 22 use thermistors with resistance values that change due to heat. There are different types of sweat including emotional sweat described above and thermal sweat for regulating body temperature, and these types of sweat can interfere with each other. Therefore, the camera CPU 46 can determine whether the sweat of the photographer is emotional sweat or thermal sweat based on the outputs of the sweat sensors 13 and 21 and the outputs of the temperature sensors 14 and 22. For example, the camera CPU 46 can determine the thermal sweat to be the sweat occurring when the temperature detected by the temperature sensor 22 is high and the sweat signal from the sweat sensor 21 is detected normally. Furthermore, the camera CPU 46 can determine the emotional sweat to be sweat occurring when the sweat signal from the sweat sensor 21 is irregular, and can therefore detect that the photographer is happy, excited, or nervous. If the temperature sensors 14 and 22 are not included, the body CPU 44 may judge whether the sweat signals from the sweat sensors 13 and 21 indicate emotional sweat or thermal sweat based on position information from the GPS module 41 or date and time information from the calendar section 38, for example. Furthermore, the lens CPU 7 may determine the sweat of the left hand to be emotional sweat or thermal sweat based on the output of the sweat sensor 13 and the output of the temperature sensor 14.

The following describes pressure measurement. The pressure sensor 15 is an electrostatic capacitance sensor, and measures a deformation amount caused by a pressing force when the photographer holds the photography lens 3. In the present embodiment, the pressure sensor 15 is disposed below operating rubber. The pressure sensor 23 is a similar electrostatic capacitance sensor, and measures the deformation amount caused by a pressing force when the photographer holds the camera body 2. The pressure sensors 15 and 23 may use distortion gauges or electrostriction elements, for example.

As described above, the camera CPU 46 works together with the lens CPU 7 to acquire biometric information of the photographer based on the output of the lens-side biosensor sections 8 and the camera-side biosensor sections 16 and to control assistance operations of the camera system 1. In the present embodiment, the biometric information of the photographer is used to display at least one of the menu setting screen and the user guide screen in the rear surface monitor 37.

Figure 8:
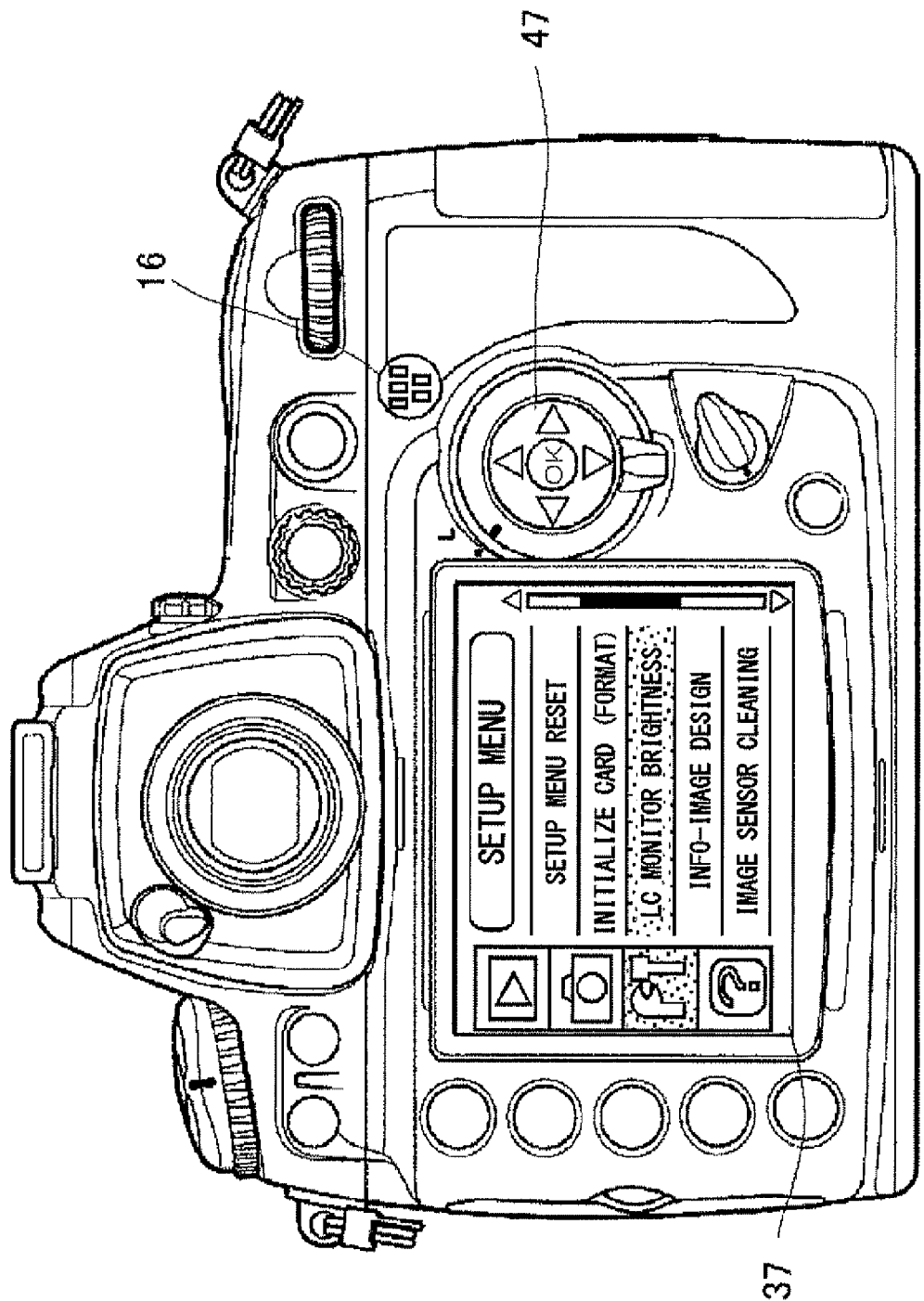
FIG. 8 is a perspective rear view of the camera system.

FIG. 8 is a perspective view of the rear surface of the camera system 1. In particular, FIG. 8 shows a state in which the menu setting screen is displayed in the rear surface monitor 37. As shown in FIG. 8, the cross SW 47 is provided near the rear surface monitor 37, and the photographer operates the cross SW 47 to move a setting target displayed in an active manner by a highlight on the menu setting screen up, down, left, and right to select a menu item. A designation button is provided in the center of the cross SW 47, and the user presses the designation button to instruct execution of the selected menu item. Concerning the display of the user guide screen, the photographer performs the same type of operation to display a prescribed screen, and this is described in detail further below.

Figure 9:
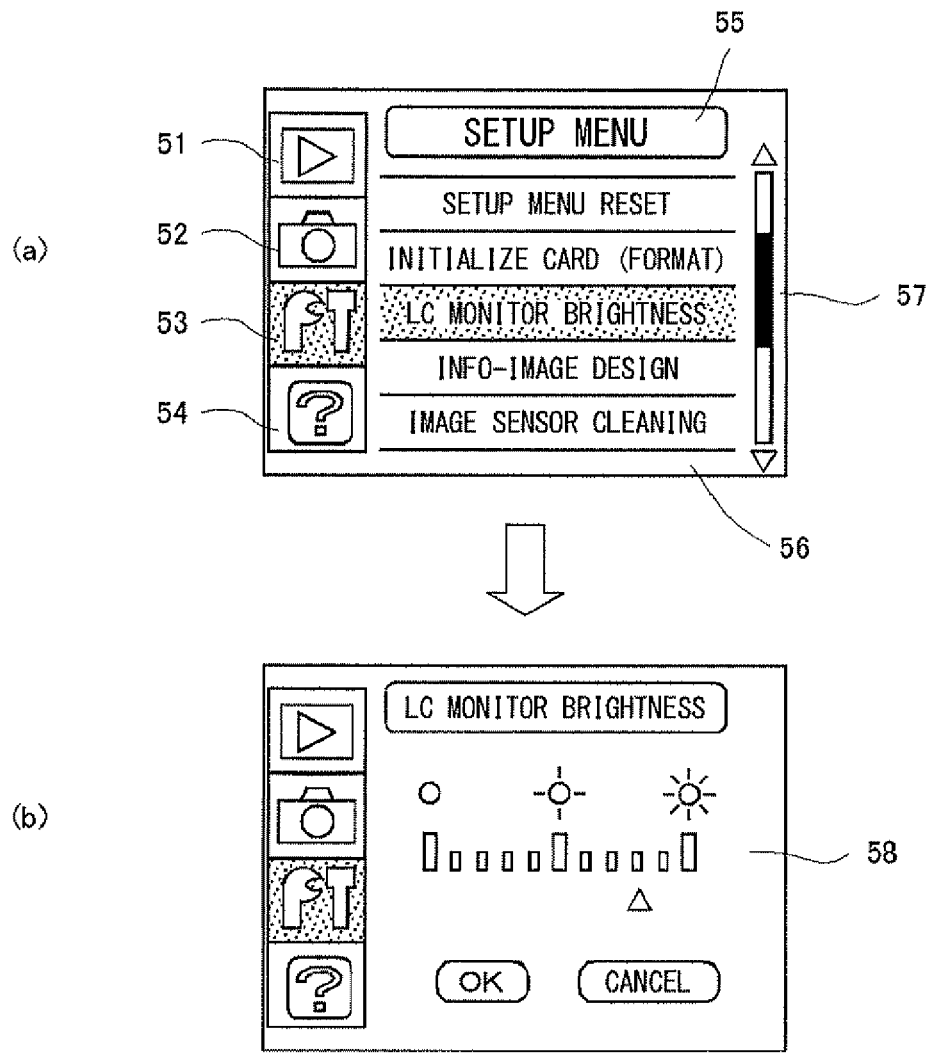
FIG. 9 is used to describe an exemplary display and hierarchical configuration of the menu setting screen.

FIG. 9 shows an exemplary display and the hierarchical configuration of the menu setting screen. As shown in (a) of FIG. 9, according to a normal hierarchical configuration of the menu setting screen, first, a play tab 51, an image capture tab 52, a set up tab 53, and a help tab 54 are lined up and displayed at the left side as category tabs. The menu items relating to playing are organized in the play tab 51. In the same manner, the menu items concerning image capturing are organized in the image capture tab 52 and the menu items concerning the usage environment of the help tab 54 are organized in the set up tab 53. Explanatory items that can be selected to display help relating to the displayed item are organized in the help tab 54.

When the photographer selects one of the play tab 51, the image capture tab 52, and the set up tab 53, the title 55 of the selected tab and the menu item list 56 in the next level organized in this tab are displayed. The tab selection is realized by using the up and down buttons on the cross SW 47 to move the active display and pressing the designation button. When one tab is selected, the active display moves to one menu item in the menu item list 56, and the cross SW 47 is operated in the same manner to make a selection. If the menu item list 56 does not fit in the display region, a scroll bar 57 is displayed such that the position of the currently active menu item can be seen.

In (a) of FIG. 9, an example is shown in which the set up tab 53 is selected and menu items relating to the usage environment of the camera system 1 are listed. When "LC monitor brightness," which is a menu item for adjusting the brightness of the rear surface monitor 37, is selected from among the menu items, for example, the display screen changes to the screen shown by (b) of FIG. 9. Here, (b) of FIG. 9 shows a menu setting screen for the selected "LC monitor brightness." As shown in FIG. 9, an indicator 58 formed by a plurality of icons expressing brightness and a bar corresponding to the selectable range is displayed, and the photographer moves the active display using the left and right buttons of the cross SW 47. The setting is then performed or cancelled by using the up and down buttons to select "OK" or "CANCEL."

In the manner described above, when setting a prescribed menu item using a normal operation, it is necessary to go to sequentially deeper levels until arriving at the menu setting screen. There is a wide variety in the nature of each menu item, and depending on the menu item, there are cases where the menu setting screen is first displayed at an even deeper level. As described above, the user guide for guiding the photographer with respect to the functions of the camera system 1 is also managed in a branching hierarchical menu system in which the user guide is divided into a plurality of categories according to type and each category includes a plurality of associated topics, in the same manner as the menu items. The following describes the user guide.

Figure 10:
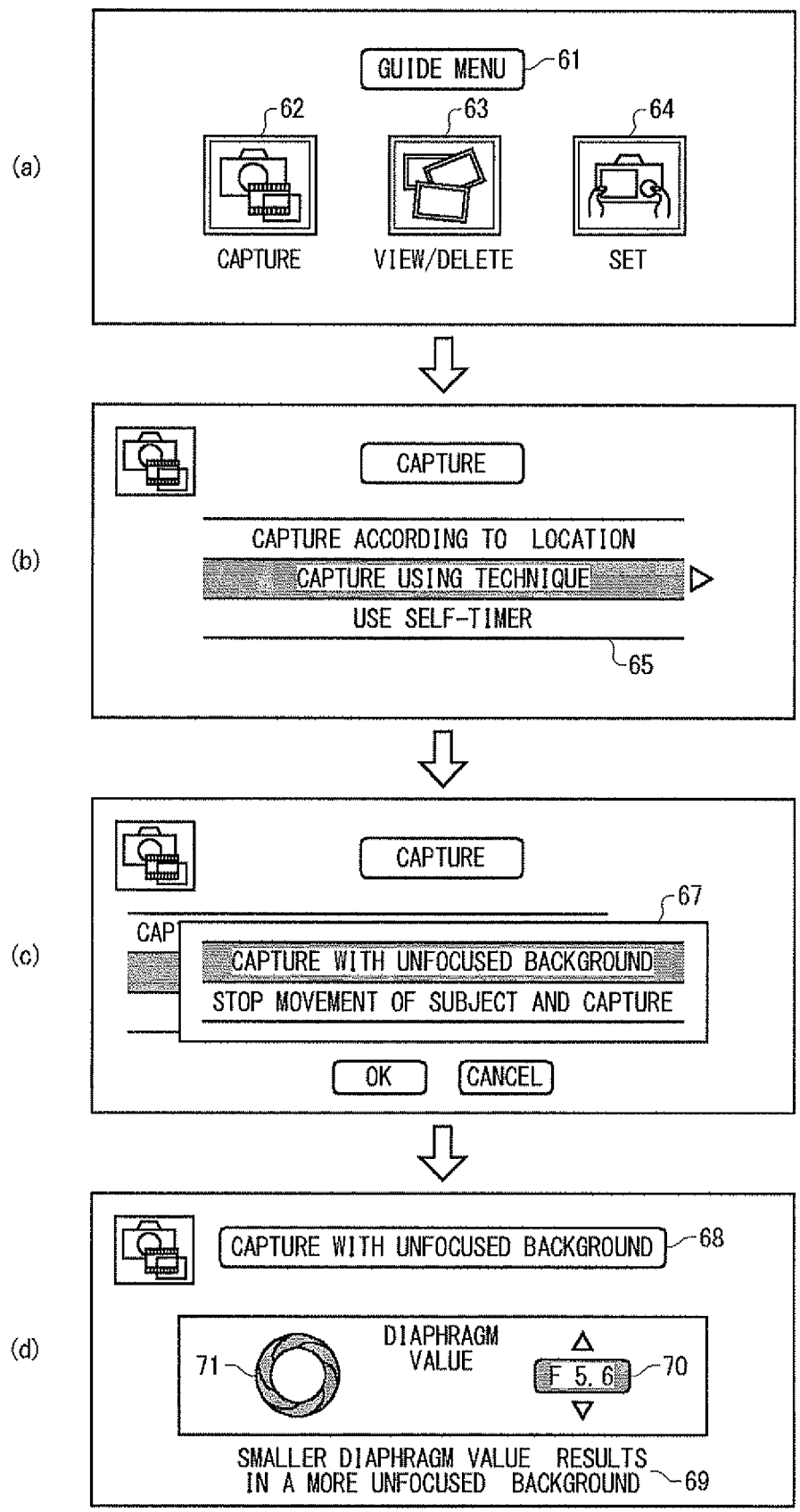
FIG. 10 is used to describe an exemplary display and hierarchical configuration of the user guide screen.

FIG. 10 describes an exemplary display and hierarchical configuration of the user guide screen. Generally, the user guide screen is displayed when the guide mode is selected by pressing "GUIDE" provided as one item on the image capturing mode SW 25. In FIG. 10, (a) is a top image of the guide menu. The guide menu displays the title 61, and below that displays an image capture icon 62, a play icon 63, and a setting icon 64 as categories corresponding to the tabs in the menu setting screen. The photographer selects any one of these icons by operating the cross SW 47. For example, when the image capture icon 62 is selected, the guide item list display shown by (b) in FIG. 10 is displayed.

In the guide item list display 65, the guide item list is shown and the photographer selects one of the guide items to be referenced, by operating the cross SW 47. As shown in FIG. 10, when "capture using technique" is selected, another pop-up window opens and the sub-item list 67 is displayed, as shown by (c) in FIG. 10. The photographer selects one guide item from the sub-item list 67. When the selection of the final guide item to be referenced is completed, the screen transitions to the screen shown by (d) in FIG. 10, and a guide for the selected item is displayed. In this example, the user guide screen for "capture with unfocused background" is displayed. As shown in FIG. 10, a detailed explanation 69 is displayed together with the title 68. A setting value 70 is also displayed, and an image illustration 71 corresponding to the setting value is displayed at the same time. When the setting value 70 is a diaphragm value of F 5.6, for example, an image of a state in which the diaphragm aperture is F 5.6 is shown. The setting value 70 can be changed by operating the cross SW 47, and can be adopted as the actual setting value.

In the manner described above, when a normal operation is performed to reference a prescribed guide item, it is necessary to go to sequentially deeper levels until arriving at the user guide screen. The content of each guide item is broad, and for other guide items the guide screen may be first displayed at a lower level. In the present embodiment, at least one of the menu setting screen and the user guide screen is displayed on the rear surface monitor 37 more directly based on the biometric information of the photographer.

Figure 11:
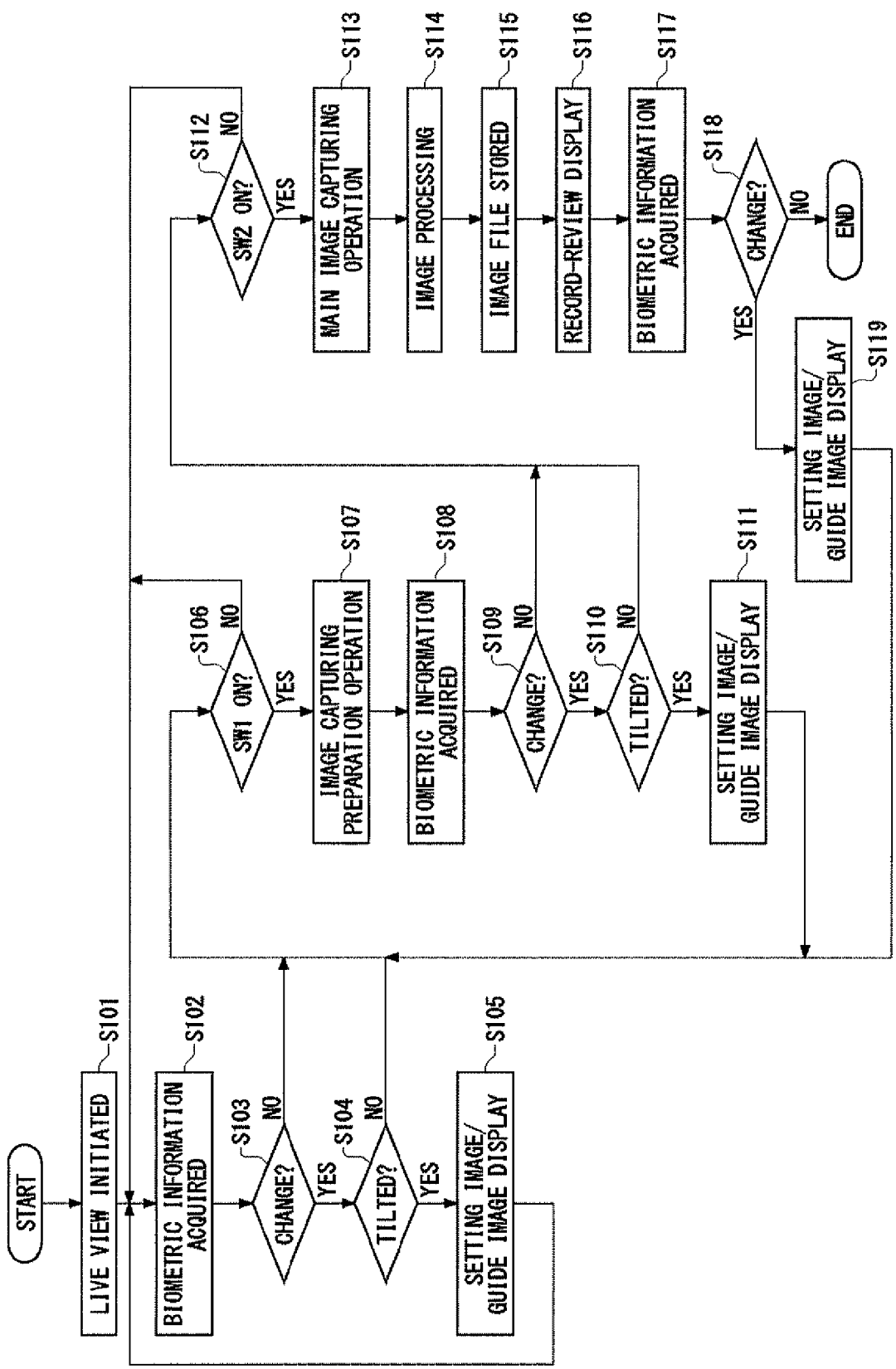
FIG. 11 shows an operational flow indicating the relationship between the series of image capturing operations and the displays of the menu setting screen and the user guide screen.

FIG. 11 is an operational flow of a process indicating the relationship between the series of image capturing operations of the camera system 1 and the displays of the menu setting screen and the user guide screen. This operational flow describes an example of still image capturing.

When the photographer begins the flow buy turning ON the power supply of the camera system 1, at step S101, the camera CPU 46 displays a live view image with adjusted exposure in the rear surface monitor 37, using the rear surface monitor control circuit 36. The camera CPU 46 displays the live view image with adjusted exposure in the rear surface monitor 37 using the rear surface monitor control circuit 36. The exposure adjustment includes using a plurality of image signals from the image capturing element 27 and causing the average brightness value of one entire image to be within a prescribed range. Prior to when the live view display begins, the main mirror 28 is provided at the reflection position, the output from the photometric sensor 40 is obtained, and the camera CPU 46 may calculate the appropriate exposure corresponding to the photometric mode.

When a prescribed time has passed from the initiation of the live view display, at step S102, the camera CPU 46 acquires the biometric information of the photographer from at least one of the camera-side biosensor sections 16 and the lens-side biosensor sections 8. At step S103, the camera CPU 46 compares the acquired biometric information to previously acquired biometric information, and determines whether there has been a change. In particular, the camera CPU 46 detects whether the emotional state of the photographer has changed from a normal state to an agitated state, i.e. an emotionally unstable state.

The biometric information for the photographer in the normal state is accumulated in the flash ROM 39. When the photographer uses the camera system 1, the camera CPU 46 periodically and intermittently acquires the biometric information of the photographer and accumulates, as the biometric information of the normal state, biometric information within a prescribed range in which the output of the sensors is stable. Accordingly, the camera CPU 46 can estimate whether the photographer is currently in the normal state by comparing the acquired biometric information to the biometric information of the normal state accumulated in the flash ROM 39. The camera CPU 46 can also determine if the photographer is in an agitated state by comparing the acquired biometric information to the biometric information of the normal state accumulated in the flash ROM 39. For example, if the output indicates that the heart rate is high and the amount of sweat is irregular compared to the normal state, the camera CPU 46 can determine that the photographer is in an agitated state.

No change in the biometric information at step S103 is estimated to mean that the photographer operating the camera system 1 while viewing the live view image is satisfied with the image capturing environment. In other words, it is estimated that the photographer is able to operate the camera system 1 as desired. On the other hand, a change in the biometric information is estimated to mean that the photographer operating the camera system 1 while viewing the live view image is not satisfied with the image capturing environment. For example, if the photographer wants to change to a prescribed image capturing mode but does not know the operation to change the setting, the photographer would become agitated, for example. The camera CPU 46 detects a change in emotional state from at least one of the lens-side bio sensor sections 8 and the camera-side biosensor sections 16. When it is positively determined that the photographer is satisfied with the image capturing environment, the estimation of a prescribed emotion may be made based on the biometric information.

As described above, the lens-side biosensor sections 8 and camera-side biosensor sections 16 are formed as integrated bodies including a variety of sensors, and each sensor outputs a different type of biometric information. By making a determination based on these individual outputs or a combination of the outputs, certain emotions of the photographer can be estimated. For example, when a high heart rate and emotional swear are detected, it can be estimated that the photographer is feeling "impatient." The relation between the sensor output and the emotion is obtained verifiably, and a correspondence table can be stored in the flash ROM 39. When estimating the emotion, a determination is made as to which prescribed emotion pattern recorded in the table matches the acquired biometric information.

When it is determined that the photographer is not in the normal state from when the operational flow is begun, it is believed that this emotional state is not caused by controlling the operation of the camera system 1 but by some other reason. Accordingly, in such a case, there is no need to perform the following display control, which is based on a change in biometric information. Furthermore, the following display control may be performed after it is determined that the photographer has returned to the normal state.

When it is determined that there is a change at step S103, the camera CPU 46 moves to step S104, acquires the output of the attitude sensor 45, and determines whether the camera system 1 is tilted. In particular, the camera CPU 46 determines if the camera system 1 is tilted forward in a position where the photographer can easily see the rear surface monitor 37. If it is determined that the camera system 1 is tilted forward, the process moves to step S105.

The state at step S105 is such that the biometric information of the photographer has changed at step S103 and the camera system 1 was tilted forward at step S104, and therefore it is estimated that the photographer is attempting to perform some setting change or guide operation while viewing the rear surface monitor 37. Therefore, at step S105, the camera CPU 46 causes at least one of the menu setting screen and the user guide screen to be displayed in the rear surface monitor 37. The determination as to whether the menu setting screen is displayed, the user guide screen is displayed, or both of these screen are displayed sequentially may be made according to a predetermined setting or according to a user setting. In particular, the present embodiment describes a case in which the camera CPU 46 determines which screen to display according to the state of the camera system 1.

The state of the camera system 1 can be determined from a variety of information. First, the usage environment can be determined from the output of an environment sensor provided to the camera system 1. For example, current position information can be obtained from longitude, latitude, and altitude information acquired as the output of the GPS module 41 and map information stored in the flash ROM 39. When it is determined from the obtained position information that the current position is a location having a famous landscape, for example, a user guide screen describing an image capturing mode suitable for capturing an image of a landscape or a menu setting screen in which the initial value is set to realize image capturing conditions suitable for capturing a landscape image can be displayed. The time information from the calendar section 38 is also used to estimate the usage environment of the camera system 1. For example, when the current time indicates that it is night, a user guide screen describing an image capturing mode suitable for night time image capturing or a menu setting screen in which the initial value is set to realize image capturing conditions suitable for night time capturing can be displayed. If the position information and the time information are combined, a user guide screen suitable for the beach on a summer day, for example, can be displayed.

The state of the camera system 1 can also be determined from information other than the output of the environment sensor. For example, the flash ROM 39 stores a usage history for a prescribed number of displays of the menu setting screen and the user guide screen described above, and regardless of the menu setting screen and the user guide screen displayed immediately before, it is preferable that the next display is different from the immediately prior display. In other words, the display history for the menu setting screen and the user guide screen is a resource indicating the state of the camera system 1. Furthermore, the immediately prior operation performed by the photographer also serves as a resource indicating the state of the camera system 1. For example, when it is determined that the state of the photographer changes to an agitated state as the result of a certain operation, it can be predicted that the result of this operation will not be pleasing to the photographer, and a user guide screen relating to another operation, for example, may be displayed.

The state of the camera system 1 can also be determined from information concerning the live view image displayed before and after the time at which the biometric information changed. For example, if the live view image includes a face of a person but the face is not being focused on, it can be estimated that the photographer wants to perform a setting relating to facial recognition. In this case, a user guide screen relating to the settings for facial recognition can be displayed, for example. The camera CPU 46 can analyze the live view images, estimate the cause of the change in the biometric information of the photographer, and display a user guide screen corresponding to the results of the estimation. Furthermore, if the camera CPU 46 detects that the photographer is agitated when deleting a captured image, the camera CPU 46 may display a menu for changing the image capturing conditions of a menu for selecting a scene mode in the rear surface monitor. The camera CPU 46 may performing image capturing with conditions differing from the image capturing conditions set by the photographer, based on the output of the environment sensor.

The above describes the process flow for capturing a still image, but another effective resource for determining the state is whether the camera system 1 is set to capture a still image or set to capture a moving image. If still image capturing is set, the displayed screen may relate to still image capturing conditions such as the image mode, e.g. the stored number of pixels (high-quality, standard, or economy), sensitivity, or number of images in series. If moving image capturing is set, the displayed screen may relate to moving image capturing conditions such as frame rate or short movie time settings. With this type of selection, the scope of potential display screens can be greatly reduced.

At step S105, at least one of menu setting screens and the user guide screens described above is displayed. It should be noted that the display is performed in a manner differing from the normal display described in FIGS. 9 and 10. In a normal display format, it is necessary to proceed to sequentially lower levels until arriving at the desired menu setting screen or user guide screen, but when the camera CPU 46 determines the state of the camera system 1 in the manner described above, the display screen desired by the photographer can be estimated. Therefore, the camera CPU 46 ignores the hierarchical configuration of the menu setting screen and the user guide screen and directly displays a screen at a lower level according to the state of the camera system 1. When displaying a screen at a lower level using the normal operation, the higher level display screen may also be displayed, according to the state of the camera system 1.

Furthermore, if a prescribed state can be determined, a setting value suitable for the function that is the setting item for that state can be predicted, and therefore the number of potential selections can differ from the menu setting items that can normally be selected. For example, in a normal diaphragm value setting display, all of the diaphragm values that can be set for the attached photography lens 3 are displayed as potential selections, but in a state where the surrounding environment is dark, the display can be limited to only a few stages of possible selections from a completely open value. Furthermore, the diaphragm values that cannot be selected can be grayed out.

The menu setting screen and user guide screen displayed at step S105 can be displayed by switching therebetween, by being superimposed on the live view, or as pop-up windows. If the photographer can see the menu setting screen and the user guide screen together with the subject image in the live-view display, the photographer can more directly understand the results of specific operations. The photographer may select in advance how these display screens are displayed. Furthermore, when the photographer inputs instructions to the menu setting screen, the touch panel sensor layered in the screen of the rear surface monitor 37 may operate.

When at least one of the menu setting screens and user guide screens is displayed in the rear surface monitor 37 at step S105, the rear surface monitor 37 returns to the live view display state and, when a prescribed time has passed, obtains the biometric information again at step S102. The prescribed time is determined according to the time needed for the emotional state of the photographer to change. For example, the prescribed time may be the time needed to return to a normal state from an agitated state. If the agitated state of the photographer continues, the operation for changing the display content of the menu setting screen and the user guide screen may be repeated.

When it is determined that there is no change in the biometric information of the photographer at step S103, particularly that the photographer is in the normal state, and that the camera system 1 is tilted at step S104, the process moves to step S106 and a determination is made as to whether the release SW 24 is pressed half way to turn ON SW1. If SW1 is not ON, the process returns to step S102 and the live view display continues. When SW1 is turned ON by the photographer, the camera CPU 46 moves to step S107 and executes an image capturing preparation operation. Specifically, the camera CPU 46 performs exposure value determination based on the output of the photometric sensor 40 and phase-difference autofocus using the focal point detection sensor 29. The autofocus may be contrast autofocus using the contrast AF circuit 19.

When the image capturing preparation operation of step S107 is finished, the process moves to step S108 and the camera CPU 46 obtains the biometric information of the photographer based on at least one of the camera-side biosensor sections 16 and the lens-side biosensor sections 8, in the same manner as in step S102. At step S109, the camera CPU 46 compares the obtained biometric information to previously obtained biometric information, and determines if there has been a change. In particular, the camera CPU 46 detects whether the emotional state of the photographer has changed from a normal state to an agitated state.

When it is determined that there is a change at step S109, the camera CPU 46 moves to step S110, acquires the output of the attitude sensor 45, and determines if the camera system 1 is tilted. In particular, the camera CPU 46 determines whether the camera system 1 is tilted forward such that the photographer can more easily view the rear surface monitor 37. If it is determined that the camera system 1 is tilted, the process moves to step S111.

The state at step S110 is such that the biometric information of the photographer has changed at step S109 and the camera system 1 was tilted forward at step S110, and therefore it is estimated that the photographer is not satisfied with the image capturing preparation operation of step S107 and is attempting to perform some setting change or guide operation. Therefore, at step S111, the camera CPU 46 causes at least one of the menu setting screen and the user guide screen to be displayed in the rear surface monitor 37. In particular, a menu setting screen or user guide screen relating to the image capturing preparation operation is extracted and displayed. For example, a menu setting screen relating to focal point adjustment or a user guide screen describing the differences in photometric modes is displayed. When the display of the menu setting screen or user guide screen at step S111 is finished, the process returns to step S106 and it is determined whether SW1 is ON.

When it is determined that there is no change in the biometric information of the photographer at step S109, particularly that the photographer is in the normal state, and that the camera system 1 is not tilted at step S110, the process moves to step S112 and it is determined whether the release SW 24 is fully pressed to turn ON SW2. If SW2 is not ON, the process returns to step S102 and the live view display continues. When SW2 is turned ON by the photographer, the camera CPU 46 moves to step S113 and executes the main image capturing operation.

In the main image capturing operation of step S113, according to the exposure value determined at step S107, the lens CPU 7 moves the diaphragm 5 and the camera CPU 46 moves the focal plane shutter to guide subject light to the image capturing element 27. Furthermore, according to the determined image capturing sensitivity, the camera CPU 46 applies a prescribed gain to the output of the image capturing element 27 and reads the charge. The process then proceeds to step S114, where the image processing control circuit 18 generates an image file by applying image processing and a compression process to the image signal generated as described above. When generation of the image file is finished, the process moves to step S115 and the generated image file is stored in the image recording medium 35 by the camera CPU 46. At step S116, the image-processed image data is displayed in the rear surface monitor 37 by the rear surface monitor control circuit 36 for a set prescribed time, e.g. approximately three seconds. The photographer can recognize the image immediately after capture using record-review.

The record-review recognition of the photographer is obtained and, at step S117, the camera CPU 46 obtains the biometric information of the photographer from at least one of the camera-side biosensor sections 16 and the lens-side biosensor sections 8. At step S118, the camera CPU 46 compares the acquired biometric information to previously acquired biometric information, and determines whether there has been a change. In particular, the camera CPU 46 detects whether the emotional state of the photographer has changed from a normal state to an agitated state. When the camera CPU 46 determines at step S118 that there is a change, the process moves to step S119.

The state at step S119 is estimated to be that the photographer is not satisfied with the captured image generated by the processes from step S113 to step S115 and requires some type of setting change or operation guide. Therefore, at step S119, the camera CPU 46 displays at least one of the menu setting screens and user guide screens in the rear surface monitor 37. In particular, a menu setting screen or user guide screen relating to the main image capturing operation or image processing is extracted and displayed. For example, a menu setting screen relating to red-eye correction or a user guide screen describing a gray scale correction processes or a color temperature correction is displayed. When the display of the menu setting screen or user guide screen at step S119 is finished, the process returns to step S106 and it is determined whether SW1 is ON.

When the record-review display is performed at step S116, it is estimated that the photographer is orienting the camera system 1 in a manner to easily view the rear surface monitor 37, and therefore the detection by the attitude sensor 45 is not performed after step S117. Furthermore, the attitude detection of step S104 and step S110 may be omitted.

When it is determined at step S118 that there is no change, the series of image capturing operations is ended. The above process flow describes an example in which a live view display is used, but the menu setting screen and user guide screen display can be performed in the same manner when the photographer views the captured field with the finder optical system 26.

The above embodiments describe examples of a still image capturing operation. However, the display of the menu setting screen and the user guide screen can be changed according to biometric information detection results in moving image capturing as well. For example, when there is a change in periodically acquired biometric information during moving image capturing, the menu setting screen and user guide screen can be displayed while continuing the moving image capturing.

An image capturing section for capturing an image of the photographer may be provided near the rear surface monitor 37, e.g. above the rear surface monitor 37, to detect the facial expression of the photographer. For example, an image of the eyebrows of the user can be captured by capturing images of the left eye and right eye of the photographer, and the photographer may be determined to be agitated when a furrow is detected in the brow. The detection of a furrow in the brow may be achieved by pattern matching with an image of a furrowed brow stored in the flash ROM 39 as a reference image, or by detecting a shadow distribution between the left and right eyes. US Patent Application Publication No. 2008-292148 describes detection of a furrowed brow. The state of the photographer can be more accurately determined if the expression detection results described above are used in addition to the output from the lens-side biosensor sections 8 and the camera-side biosensor sections 16.

In the above embodiments, the camera body 2 and the photography lens 3 are respectively provided with the lens-side biosensor sections 8 and the camera-side biosensor sections 16. However, the biosensors may be formed independently and attached more directly to the body of the photographer. For example, a biosensor formed as a wrist watch, such as described in Japanese Patent Application Publication No. 2005-270543, may be used. In this case, the camera system 1 may include a biometric information acquiring section that uses a wire or that is wireless. When a plurality of biosensors are provided, the output of each biosensor is different. In such a case, a determination can be made in advance as to which biosensor's output is prioritized, or an average value of the output can be calculated.

In the above embodiments, there is no specific description about the power supply, but it is obvious that the camera system 1 operates by receiving power. The camera system 1 can continuously receive power from a domestic AC power supply, and can also receive power from a detachable battery. The battery may be one-dimensional or two-dimensional.

A plurality of batteries can be attached and detached according to the properties of the device that supplies power. For example, when the camera body 2 and the photography lens 3 are formed as separate units, as in the above embodiment, a battery may be equipped in each unit. In this case, the battery equipped in the camera body 2 may provides power primarily to the camera body 2, and the battery equipped in the photography lens 3 provides power primarily to the photography lens 3. Accordingly, the drive power for driving the focus lens is supplied by the battery equipped in the photography lens 3. Of course, when a battery is empty, for example, one of the batteries can supply power to compensate for the empty battery.

In the above embodiments, the camera system 1, which is a single lens reflex camera with an exchangeable lens, is provided as an example of the mobile apparatus, but the present invention is not limited to the camera system 1. The present invention can also be applied to a compact digital camera, a mirrorless single lens camera, a video camera, or any electronic apparatus (e.g. notebook computers, game devices, mobile phones, or music players) in which display of a menu setting screen or user guide screen can be changed according to change in biometric information of the user.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

DESCRIPTION OF THE REFERENCE NUMERALS

1: camera system, 2: camera body, 3: photography lens, 4: lens group, 5: diaphragm, 6: angular velocity sensor, 7: lens CPU, 8: lens-side biosensor section, 9: heart rate detection apparatus, 10: drive circuit, 11: A/D conversion circuit, 12: pulse detection apparatus, 13: sweat sensor, 14: temperature sensor, 15: pressure sensor, 16: camera-side biosensor section, 17: heart rate detection apparatus, 18: image processing control circuit, 19: contrast AF circuit, 20: pulse detection apparatus, 21: sweat sensor, 22: temperature sensor, 23: pressure sensor, 24: release SW, 25: image capturing mode SW, 26: finder optical system, 27: image capturing element, 28: main mirror, 29: focal point detection sensor, 30: sub-mirror, 31: focusing screen, 32: pentaprism, 33: low-pass filter, 34: image capturing substrate, 35: image recording medium, 36: rear surface monitor control circuit, 37: rear surface monitor, 38: calendar section, 39: flash ROM, 40: photometric sensor, 41: GPS module, 42: microphone, 43: speaker, 44: RAM, 45: attitude sensor, 46: camera CPU, 47: cross SW, 51: play tab, 52: image capture tab, 53: set up tab, 54: help tab, 55: title, 56: menu item list, 57: scroll bar, 58: indicator, 61: title, 62: image capture icon, 63: play icon, 64: setting icon, 65: guide item list, 67: sub-item list, 68: title, 69: explanation, 70: setting value, 71: image illustration

The invention claimed is:

1. An electronic apparatus comprising:
a processing section that performs processing;
a display section that performs display; and
a control section that inputs biometric information from a hand or wrist of a user and causes the display section to display a display screen that includes at least one of a setting screen and a guide screen relating to the processing of the processing section in accordance with the input of the biometric information,
wherein the control section causes the display section to display one display screen when a change in the biometric information of the user is detected, and to display a different display screen when a change in the biometric information of the user is not detected.

2. The electronic apparatus according to claim 1, comprising an attitude sensor that detects attitude of the electronic apparatus, wherein
the control section causes the display section to display the display screen when the attitude sensor detects that the electronic apparatus has a designated attitude.

3. The electronic apparatus according to claim 1, wherein the guide screen has a hierarchical configuration according to content of functions for guiding, and
the control section causes the display section to display the guide screen of a different hierarchical level upon detection of a change in the biometric information.

4. The electronic apparatus according to claim 1, wherein the control section causes the display section to display the setting screen with a different number of potential selections for a function to be set, when the setting screen is displayed in the display section and a change in the biometric information is detected.

5. The electronic apparatus according to claim 1, wherein the control section is capable of causing the display section to change the display screen being displayed, even when no change is detected in the biometric information.

6. The electronic apparatus according to claim 1, comprising a sensor that detects at least one of a position of the electronic apparatus, time, and date, wherein
the control section changes the display screen based on an output of the sensor.

7. The electronic apparatus according to claim 6, comprising an image capturing section that photoelectrically converts an incident optical image, wherein
the control section causes the display section to display image capturing conditions that are changed based on the output of the sensor.

8. The electronic apparatus according to claim 1, wherein the control section causes the display section to display the display screen relating to an operation that is different from an operation performed by the user when the change was detected.

9. The electronic apparatus according to claim 1, comprising a history storage section that stores usage histories of the setting screen and the guide screen, wherein
the control section changes the display screen that is displayed in the display section, based on the usage history read from the history storage section.

10. The electronic apparatus according to claim 1, comprising a touch sensor that is arranged overlapping the display section, wherein
the control section receives input from the touch sensor when the display screen is displayed in the display section.

11. The electronic apparatus according to claim 1, comprising:
an image capturing section that photoelectrically converts an incident optical image; and
an analyzing section that analyzes a captured image that is captured by the image capturing section, wherein
the control section changes the display screen that is displayed in the display section, based on an analysis result of the analyzing section.

12. An electronic apparatus comprising:
an image capturing section that photoelectrically converts an incident optical image;
a processing section that performs processing;
a display section that performs display; and
a control section that inputs biometric information from a hand or wrist of a user and causes, the display section to display a display screen that includes at least one of a setting screen and a guide screen relating to the processing of the processing section in accordance with the input of the biometric information,
wherein the control section causes the display section to display the display screen relating to still image capturing when the image capturing by the image capturing section is set to be still image capturing, and causes the display section to display the display screen relating to moving image capturing when the image capturing by the image capturing section is set to be moving image capturing.

13. The electronic apparatus according to claim 12, wherein
the control section causes the display section to display the display screen together with a subject image that is captured by the image capturing section and displayed sequentially.

14. The electronic apparatus according to claim 1, comprising:
an optical unit including an optical system that passes subject light; and
a power supply section that is arranged in the optical unit and supplies power at least to the optical unit.

15. The electronic apparatus according to claim 1, comprising an expression detecting section that detects an expression of the user, wherein
the control section causes the display section to display at least one of the setting screen and the guide screen, according to a detection result of the expression detecting section.

16. An electronic apparatus comprising:
an image capturing section that captures an image;
a processing section that performs processing;
a display section that performs display relating to the processing section;
an attitude sensor that detects an attitude of the electronic apparatus;
a sensor that detects at least one of a position of the electronic apparatus, time, and date; and
a control section that changes the display of the display section based on the attitude sensor and the sensor,
wherein the control section changes a capturing condition based on the output of the sensor, and
wherein the control section changes the capturing condition when the user deletes a captured image.

17. The electronic apparatus according to claim 16, wherein
the control section causes the display section to display a display screen that includes at least one of a setting screen and a guide screen relating to the processing of the processing section.

18. The electronic apparatus according to claim 17, comprising a history storage section that stores usage histories of the setting screen and the guide screen, wherein the control section changes the display screen that is displayed on the display section, based on the usage history read from the history storage section.

19. The electronic apparatus according to claim 16, comprising an input section that inputs biometric information of a user.

20. The electronic apparatus according to claim 1, wherein the biometric information is body temperature, amount of sweat, blood pressure, blood flow, or heart rate of the user.

* * * * *